(12) United States Patent
Taniguchi et al.

(10) Patent No.: US 7,137,940 B2
(45) Date of Patent: Nov. 21, 2006

(54) MACHINING CENTER

(75) Inventors: Takao Taniguchi, Aichi-ken (JP);
Toshiyuki Andou, Aichi-ken (JP);
Mitsuhiro Yamada, Aichi-ken (JP);
Kazutaka Murai, Aichi-ken (JP);
Yuichiro Yoshimura, Aichi-ken (JP);
Jiro Nishida, Aichi-ken (JP); Atsushi Kohama, Aichi-ken (JP); Shigeto Noma, Aichi-ken (JP); Michio Norimatsu, Aichi-ken (JP); Seiichi Kodama, Aichi-ken (JP); Haruhiko Koike, Aichi-ken (JP)

(73) Assignees: Aisin AW Co., Ltd., Aichi-ken (JP);
Yamazaki Mazak Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/379,674

(22) Filed: Apr. 21, 2006

(65) Prior Publication Data
US 2006/0183611 A1    Aug. 17, 2006

Related U.S. Application Data

(62) Division of application No. 10/891,705, filed on Jul. 15, 2004, now Pat. No. 7,063,654.

(30) Foreign Application Priority Data

Jul. 18, 2003    (JP) .............................. 2003-198988

(51) Int. Cl.
*B23Q 3/157*    (2006.01)
*B23C 1/14*    (2006.01)
*B23C 1/06*    (2006.01)

(52) U.S. Cl. ........................... 483/56; 483/27; 483/18; 483/14; 409/166; 409/185; 409/198; 409/221; 409/206; 409/235; 408/71

(58) Field of Classification Search ............ 483/54–57, 483/27, 18, 17, 22, 26, 66–67, 900, 14, 3; 409/165–166, 183, 185, 190–191, 198, 202, 409/204, 206, 212, 221, 235; 408/70–71
See application file for complete search history.

(56) References Cited

U.S. PATENT DOCUMENTS

| 3,460,435 A | | 8/1969 | Hucks et al. | |
| 3,516,149 A | * | 6/1970 | Mickas | .................. 483/34 |
| 3,587,390 A | * | 6/1971 | Lohneis et al. | ............. 409/221 |

(Continued)

FOREIGN PATENT DOCUMENTS

DE    3721610 A1    1/1989

(Continued)

*Primary Examiner*—Erica Cadugan
(74) *Attorney, Agent, or Firm*—Duane Morris LLP

(57) ABSTRACT

Machining is possible in such a manner that an optional position of a workpiece is positioned just under a tool by rotation of a turn table in a C-axis direction, movement of the turn table in a Y-axis direction, and movement of a spindle in a Z-axis direction, so that a width of a main unit in a X-axis direction can be made shorter in comparison with machining by moving the turn table in the X-axis direction. Besides, the turn table located on a front side of the main unit, an ATC located on the rear side thereof, and a separated control panel located on the rear side of the ATC, independent from the main unit can also make the width of a machining center in the X-axis direction shorter.

3 Claims, 5 Drawing Sheets

U.S. PATENT DOCUMENTS

| | | | |
|---|---|---|---|
| 3,990,585 A * | 11/1976 | Johansson | 483/42 |
| 4,087,901 A | 5/1978 | Lohneis et al. | |
| 4,333,363 A | 6/1982 | Inaba et al. | |
| 4,358,888 A | 11/1982 | Zankl et al. | |
| RE31,288 E | 6/1983 | Matsuzaki et al. | |
| 4,499,650 A * | 2/1985 | Cannon et al. | 483/3 |
| 4,529,342 A * | 7/1985 | Babel | 409/221 |
| 4,575,918 A | 3/1986 | Mattson | |
| 4,621,407 A | 11/1986 | Suzuki | |
| D301,040 S | 5/1989 | Gemmani | |
| 4,987,668 A | 1/1991 | Roesch | |
| 5,058,261 A * | 10/1991 | Kitamura | 483/18 |
| 5,624,363 A | 4/1997 | Kuriki | |
| 5,762,594 A | 6/1998 | Hoppe | |
| 5,933,933 A | 8/1999 | Fritz et al. | |
| 6,200,247 B1 | 3/2001 | Braun | |
| 6,293,742 B1 | 9/2001 | Miyagi et al. | |
| 2001/0041651 A1 | 11/2001 | Abe et al. | |

FOREIGN PATENT DOCUMENTS

| | | |
|---|---|---|
| DE | 10144424 A1 * | 3/2003 |
| JP | 60020833 B4 | 2/1985 |
| JP | 2000158217 | 6/2000 |

* cited by examiner

MACHINING CENTER

CROSS REFERENCE TO RELATED APPLICATION

This application is a division of U.S. application Ser. No. 10/891,705, filed Jul. 15, 2004, now U.S. Pat. No. 7,063,654.

BACKGROUND OF THE INVENTION

This invention relates to a vertical type machining center, restricting a width in its right/left direction (a X-axis direction).

In such kind of a machining center, a workpiece is fixedly positioned on a table, and a tool is attached to an lower end of a vertical spindle, and the workpiece and the tool are three-dimensionally (in three axes directions) moved, relative to each other when machining the workpiece. That is, the machining center is for executing machining on a workpiece by relatively moving a tool in a X-axis direction (in a right/left direction), in a Y-axis direction (a front/rear direction) and in a Z-axis direction (an up/down direction) with respect to a workpiece.

Referring to the relative movement in the X-axis direction of the above-mentioned movements in the three axes directions, it is general to relatively move a table in the X-axis direction, without moving a tool (a spindle) (see Japanese patent application: publication number 2000-158217).

But, it is difficult to make the width of the whole machining center in the X-axis direction (the right/left direction) shorter if it has a structure of moving the table in the X-axis direction. In other words, the problem of such kind of machining center is that it is difficult to make the width of the whole portion shorter.

This point of problem is now explained, referring to FIG. 4(a), (b). In this case, a hole Hi is formed near a left end portion of a workpiece A, the maximum width to be machined in the X-axis direction of which is Wmax, and thereafter, a hole H2 is formed near a right end portion thereof.

Firstly, the workpiece A is positioned and fixed on a table 100. As shown in (a), the table 100 is moved in a positive direction of the X-axis direction so that the portion of the workpiece A to be machined is positioned under a tool 102 which is attached to a top end (lower end) of a spindle 101. Then, the hole H1 is formed by moving the spindle 101 in a negative direction of the Z-axis. Thereafter, the table 100 is moved in the negative direction of the X-axis so that the portion of the workpiece A to be machined next is positioned under the tool 102. Then, the hole H2 is formed by moving the spindle 101 in the negative direction of the Z-axis, as shown in (b).

At the time of forming of the hole H1, almost the whole workpiece A is positioned on the right side of the spindle 101, as shown in FIG. 4(a). On the other hand, at the time of forming of the hole H2, almost the whole workpiece A is positioned on the left side of the spindle 101, as shown in FIG. 4(b) That is, the workpiece A moves within almost twice that of the maximum machining width Wmax along the X-axis direction. For this reason, the width of the whole machining center in the X-axis direction is at least 2 Wmax, so that it is impossible to make the width shorter. This means that the width of the whole in the X-axis direction is very long when arranging a plurality of machining centers in the X-axis direction in a line.

Under this circumstance, the machining center having shorter width in the X-axis direction is desired. Furthermore, it is desired to solve problems at the time when arranging a plurality of machining centers (such as three or more), having shorter width in the X-axis direction, in a line in the X-axis direction, such as their maintenance, tool exchange and dealing with chips.

SUMMARY OF THE INVENTION

The invention is a machining center for machining a workpiece on a table, comprising:

a spindle being movable in a Y-axis direction (front/rear direction) and in a Z-axis direction (up/down direction) with respect to a main unit, and being immovable in a X-axis direction (right/left direction), the spindle having a tool mounting portion on its end;

a turn table located on a front side of the main unit, the turn table having a horizontal workpiece mounting face which rotates only in a C-axis direction (rotation around Z-axis); the rotation axis is immovable alone the X-axis;

an automatic tool changer located on the rear side of the turn table on the main unit side, having a tool change position on a Y-Z plane; and a separated control panel independently formed from the main unit, the separated control panel located on a rear side of the automatic tool changer;

characterized in that machining is executed on a workpiece on the workpiece mounting face by rotation of the turn table in the C-axis direction and movement of the spindle in the Y-axis direction and in Z-axis direction, and a tool is exchanged between the spindle and the automatic tool changer by relative movement between the spindle and the automatic tool changer in the Y-axis direction and in the Z-axis direction.

According to this aspect of the invention, an optional point on the workpiece mounting face can be positioned just under the tool mounting portion which is a top end of the spindle by combination of rotation of the turn table in the C-axis direction and the movement of the spindle in the Y-axis direction, that is, by rotating the workpiece mounting face of the turn table in the C-axis direction and moving the vertical spindle in the Y-axis direction. When putting a workpiece on the workpiece mounting face of the turn table and attaching a tool to the tool mounting portion of the spindle, the optional point of the upper face of the workpiece can be positioned just under the tool. In this state, the spindle is rotated and is lowered in the Z-axis direction, so that the optional position of the upper face of the workpiece can be machined by the tool.

In this way, the optional position of the upper face of the workpiece is positioned just under the tool by rotation of the turn table in the C-axis direction and movement of the spindle on the Y-Z plane, and the workpiece is machined, thereby making the width of the main unit in the X-axis direction (in the right/left direction) shorter in comparison with machining by movement of the table in the X-axis direction.

Besides, the turn table located on a front side of the main unit, an automatic tool changer located on the rear side thereof, and the separated control panel located on the rear side of the ATC, independent from the main unit can also make the width of the whole machining center in the X-axis direction (the right/left direction) shorter.

Besides, a tool is exchanged between the spindle and the automatic tool changer by relative movement of the both on the Y-Z plane, that is, without moving the both in the X-axis direction, so that this can also make the width of the machining center in the X-axis direction shorter.

The invention is the machining center wherein the automatic tool changer is movable in the Y-axis direction.

According to this aspect of the invention, the automatic tool changer is movable in the Y-axis direction, so that time for tool exchange between the spindle and the automatic tool changer can be shortened when moving both the spindle and the automatic tool changer in the Y-axis direction so that the both approach each other in comparison with a case of moving either of both.

The invention is a machining center for machining a workpiece on a table, comprising:

a spindle being movable in a Z-axis direction with respect to a main unit, and being impossible to move in a Y-axis direction and in a X-axis direction, the spindle having a tool mounting portion on its end;

a turn table located on a front side of the main unit, the turn table having a horizontal workpiece mounting face which rotates only in a C-axis direction;

a slide base for moving the turn table in the Y-axis direction;

an automatic tool changer located on the rear side of the turn table on the main unit side, having a tool change position on a Y-Z plane, the automatic tool changer being movable in the Y-axis direction; and a separated control panel independently formed from the main unit, the separated control panel located on a rear side of the automatic tool changer;

characterized in that machining is executed on a workpiece on the workpiece mounting face by rotation of the turn table in the C-axis direction, movement of the slide base in the Y-axis direction and movement of the spindle in Z-axis direction, and a tool is exchanged between the spindle and the automatic tool changer by movement of the spindle in the Z-axis direction and movement of the automatic tool changer in the Y-axis direction.

According to this aspect of the invention, an optional point on the workpiece mounting face can be positioned just under the tool mounting portion which is a top end of the spindle by combination of rotation of the turn table in the C-axis direction and the movement of the slide base relative to the spindle in the Y-axis direction, that is, by rotating the workpiece mounting face of the turn table in the C-axis direction and moving the slide base so as to move the workpiece mounting face in the Y-axis direction. When putting a workpiece on the workpiece mounting face of the turn table and attaching a tool to the tool mounting portion of the spindle, the optional point of the upper face of the workpiece can be positioned just under the tool. In this state, the spindle is rotated and is lowered in the Z-axis direction, so that the optional position of the upper face of the workpiece can be machined by the tool.

In this way, the optional position of the upper face of the workpiece is positioned just under the tool by rotation of the turn table in the C-axis direction and movement of the slide base relative to the spindle in the Y-axis direction, and the workpiece is machined, thereby making the width of the main unit in the X-axis direction (in the right/left direction) shorter in comparison with machining by movement of the table in the X-axis direction.

Besides, the turn table located on a front side of the main unit, an automatic tool changer located on the rear side thereof, and the separated control panel located on the rear side of the ATC, independent from the main unit can also make the width of the whole machining center in the X-axis direction (the right/left direction) shorter.

Besides, a tool is exchanged between the spindle and the automatic tool changer by relative movement of the both on the Y-Z plane, that is, without moving the both in the X-axis direction, so that this can also make the width of the machining center in the X-axis direction shorter.

The invention is the machining center, wherein the automatic tool changer is attached on the slide base, and is moved in the Y-axis direction together with the turn table with movement of the slide base in the Y-axis direction.

According to this aspect of the invention, the automatic tool changer is attached to the slide base for moving the turn table in the Y-axis direction, that is, both the turn table and the automatic tool changer are provided at the same slide base, so that an individual mechanism and a driving source for moving the automatic tool changer are not necessary, thereby simplifying the structure.

The invention is the machining center, wherein a chip carrying unit for carrying chips to a collecting point which is set between the automatic tool changer and the separated control panel is provided, extending in a rear direction from a lower portion of the turn table via a lower portion of the automatic tool changer.

According to this aspect of the invention, the separated control panel which is independent from the main unit, is located at the rear side of the automatic tool changer, thereby setting a chip collecting point between the automatic tool changer and the separated control panel. And, the chips produced on the main unit side can be carried with the chip carrying unit from the lower portion of the turn table to the chip collecting point via the lower portion of the automatic tool changer.

Therefore, the chip carrying unit can be easily stored within the width of the machining center in the X-axis direction by the separated control panel formed independently from the main unit, the chip collecting point set between the automatic tool changer and the separated control panel, and the chip carrying unit for carrying the chips in the rear direction along the Y-axis for the chip collecting point.

The invention is the machining center, wherein the separated control panel is movable in a rear direction, so that a working space is formed between the separated control panel which was moved in the rear direction and the main unit.

According to this aspect of the invention, the separated control panel is movable in the rear direction, and a working space is formed between the separated control panel and the main unit when moving the separated control panel, thereby improving working efficiency when attaching or detaching a tool to or from the automatic tool changer by a worker in the working space.

The invention is the machining center, wherein a console panel is provided so as to be electrically connected with the separated control panel, being free to recede in an upper direction in a front side of the main unit.

According to this aspect of the invention, the console panel is provided on the front side of the main unit, being free to recede in the upper direction, so that the console panel does not interfere with the operations of attachment and detachment of a workpiece to and from the turn table by a worker. Besides, the console panel which receded in the upper direction does not interfere with the machining centers adjacent to one having the console panel, of a plurality of machining centers which are arranged in the X-axis direction (the right/left direction).

The invention is a machining center for machining a workpiece on a table, comprising:

a spindle being movable in a Z-axis direction and in a Y-axis direction with respect to a main unit, and being impossible to move in a X-axis direction, the spindle having a tool mounting portion on its end;

a turn table located on a front side of the main unit, the turn table having a horizontal workpiece mounting face which rotates only in a C-axis direction;

a slide base for moving the turn table in the Y-axis direction;

an automatic tool changer located on the rear side of the turn table on the main unit side, having a tool change position on a Y-Z plane, the automatic tool changer being movable in the Y-axis direction; and a separated control panel independently formed from the main unit, the separated control panel located on a rear side of the automatic tool changer;

characterized in that machining is executed on a workpiece on the workpiece mounting face by rotation of the turn table in the C-axis direction, movement of the slide base relative to the spindle in the Y-axis direction and movement of the spindle in Z-axis direction, and a tool is exchanged between the spindle and the automatic tool changer by movement of the spindle in the Z-axis direction and movement of the automatic tool changer relative to the spindle in the Y-axis direction.

According to this aspect of the invention, an optional point on the workpiece mounting face can be positioned just under the tool mounting portion which is a top end of the spindle by combination of rotation of the turn table in the C-axis direction and the movement of the slide base relative to the spindle in the Y-axis direction, that is, by rotating the workpiece mounting face of the turn table in the C-axis direction and moving the slide base relative to the spindle so as to move the workpiece mounting face in the Y-axis direction. When putting a workpiece on the workpiece mounting face of the turn table and attaching a tool to the tool mounting portion of the spindle, the optional point of the upper face of the workpiece can be positioned just under the tool. In this state, the spindle is rotated and is lowered in the Z-axis direction, so that the optional position of the upper face of the workpiece can be machined by the tool.

In this way, the optional position of the upper face of the workpiece is positioned just under the tool by rotation of the turn table in the C-axis direction and movement of the slide base relative to the spindle in the Y-axis direction, and the workpiece is machined, thereby making the width of the main unit in the X-axis direction (in the right/left direction) shorter in comparison with machining by movement of the table in the X-axis direction.

Besides, the turn table located on a front side of the main unit, an automatic tool changer located on the rear side thereof, and the separated control panel located on the rear side of the ATC, independent from the main unit can also make the width of the whole machining center in the X-axis direction (the right/left direction) shorter.

Besides, a tool is exchanged between the spindle and the automatic tool changer by relative movement of the both on the Y-Z plane, that is, without moving the both in the X-axis direction, so that this can also make the width of the machining center in the X-axis direction shorter.

DESCRIPTION OF THE PREFERRED EMBODIMENT

Figure 1:
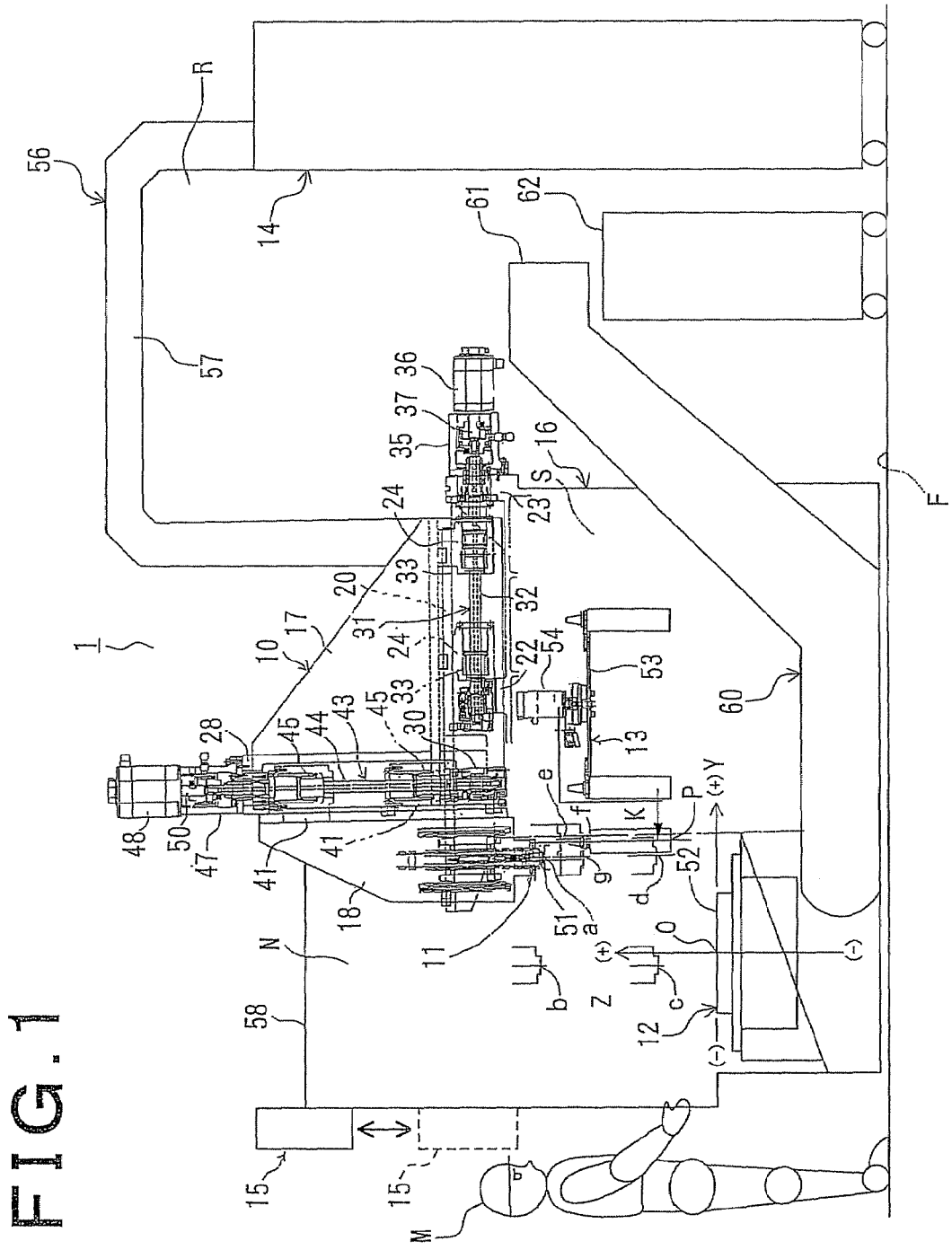
FIG. 1 is a view showing a section obtained by cutting a machining center 1 according to a first embodiment by a Y-Z plane, seen from a right side.

Embodiments of the invention will now be explained, referring to the appended drawings.

The same reference numeral is given to the elements in the respective figures, having the same structure and the same operation, thereby properly omitting explaining the respective elements one by one.

First Embodiment

Figure 2:
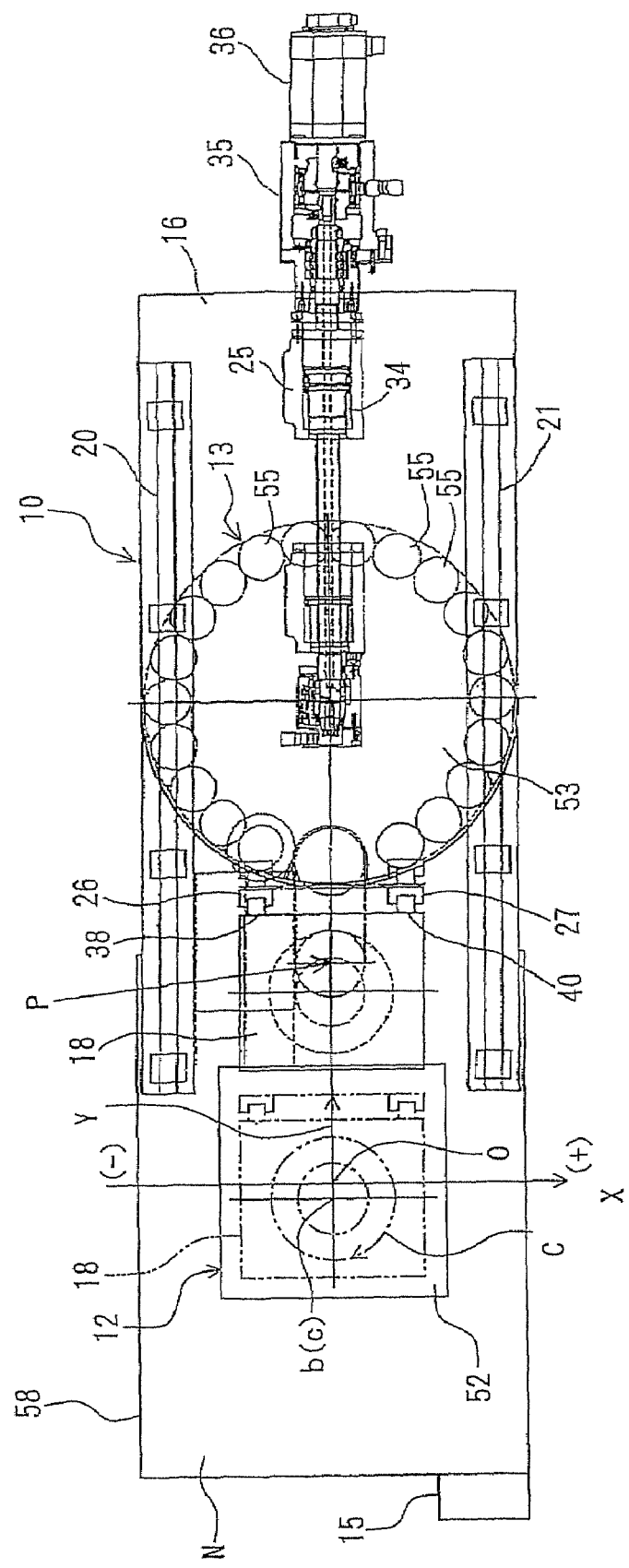
FIG. 2 is a top view of the machining center 1 removing a column 18, a Z-axis ball screw 43, a Z-axis servo-motor 48 therefrom.

FIGS. 1, and 2 show a machining center 1 according to the first embodiment according to the present invention which is an instance of a machining center. That is, FIG. 1 is a view showing a section obtained by cutting the machining center 1 by a Y-Z plane, seen from a right side, and FIG. 2 is a top view of a main unit 10 and a turn table 12 of the machining center 1. But, a column 17, a Z-axis ball screw 43 and a Z-axis servo-motor 48 are not shown in FIG. 2 for easy explanation.

In the following explanation, X-, Y-, Z-axes of the machining center 1 are determined as follows according to a general definition of a vertical type machining center. An up/down direction in FIG. 2 is "a X-axis direction (a right/left direction)" of the machining center 1, and a right/left direction in FIGS. 1 and 2 is "a Y-axis direction (a front/rear direction)" of the machining center 1, and an up/down direction in FIG. 1 is "a Z-axis direction (an up/down direction)" of the machining center 1. And, positive and negative directions of the X-, Y- and Z-axes are shown in the figures. For easy explanation, an origin of the X-, Y- and Z-axes is an rotational center O of a workpiece mounting face 52 of the turn table 12.

As shown in FIGS. 1 and 2, the machining center 1 has the spindle 11 which is a part of the main unit 10, a turn table 12 arranged on the front side of the main unit 10, an automatic tool changer (ATC) 13 located on the rear side of the turn table 12, a separated control panel 14 located on the rear side of the ATC 13 and a console panel 15 located on the front side of the main unit 10, capable of retreating. Further explanation is given, starting from the main unit 10.

Main structural elements of the main unit 10 are a base 16 which is a basis at the time of locating the whole main unit 10 on a floor F, the column 17 supported by the base 16 so as to be movable in the Y-axis direction, a head 18 supported by the column 17 so as to be movable in the Z-axis direction, and the spindle 11 supported by the head 18 so as to be rotatable.

As shown in FIG. 2, a pair of guide rails 20, 21 are formed on an upper portion of the base 16. The guide rails 20, 21 are formed near the left end portion (near the upper end portion of FIG. 2) and near the right end portion (near the lower end portion of FIG. 2) in the upper portion of the base 16 for the Y-axis direction. And, each of the guide rails 20, 21 has two inclined faces. These two faces are combined and formed as a mountain shape of a scalene triangle in a cross section perpendicular to a longitudinal direction.

Both guide rails 20, 21 are guide faces for guiding the column 17 in the Y-axis direction. Supporting portions 22, 23 are formed in an almost central portion in the X-axis direction in the upper portion of the base 16, on the front side and at the rear end in the Y-axis direction, as shown in FIG. 1. Both supporting portions 22, 23 are supporting portions for directly holding a screw shaft 32 of a Y-axis ball screw 31 for moving the column 17 in the Y-axis direction. The base 16 has the shape of a gate when seeing from the front face, and has a space S penetrating in the Y-axis direction. In the space S, the ATC 13 and a chip carrying unit 60 are arranged.

The column 17 is put on the guide faces of the guide rails 20, 21 of the base 16 so as to be movable in the Y-axis direction along the guide rails 20, 21. A supporting portion 24 is formed at a lower face of the column 17 in an almost central portion in the X-axis direction. The supporting portion 24 is arranged on the front hand of the rear supporting portion 23 of the base 16. The supporting portion 24 is for supporting a nut 33 of the Y-axis ball screw 31. The supporting portion 24 on the rear side of the front supporting portion 22 of the base 16 which is shown with a two-dot chain line shows the position thereof at the time when moving the column 17 in the front direction.

As shown in FIG. 2, a pair of guide rails 26, 27 are formed on the front end of the column 17, and are provided near the left edge portion (near the upper end portion of FIG. 2) and near right edge portion (near the lower end portion of FIG. 2) on the front edge of the column 17 for the Z-axis direction. Both guide rails 26, 27 are guides for moving the head 18 in the Z-axis direction. Supporting portions 28, 30 are formed on the upper side and lower side in FIG. 1 in an almost central portion in the X-axis direction on the front end of the column 17. Both supporting portions 28, 30 are ones for directly holding a screw shaft 44 of the Z-axis ball screw 43 for moving the head 18 in the Z-axis direction.

The Y-axis ball screw 31 is installed between the column 17 and the base 16. The Y-axis ball screw 31 has the screw shaft 32, the nut 33 and many balls installed therebetween (not shown). The screw shaft 32 is located for the Y-axis direction. Detailedly speaking, the screw shaft 32 is located parallel to the Y-axis on the Y-Z plane. The screw shaft 32 is rotatably supported by the front supporting portion 22 of the base 16 through a bearing in its front end side, and is rotatably supported by the rear supporting portion 23 of the base 16 through a bearing in its rear side. An output shaft 37 of a Y-axis servo-motor 36 is connected with the rear end of the screw shaft 32, that is, the portion projecting from the supporting portion 23 in the rear direction through a coupling 35. The nut 33 is fixed by the supporting portion 24 of the column 17 with respect to the screw shaft 32, and is fitted on the screw shaft 32. The nut 33 is a double nut for removing backlash.

In such structured Y-axis ball screw 31, the screw shaft 32 is normally rotated through the coupling 35 by normal rotation of the Y-axis servo-motor 36, and the nut 33 fitted thereon is moved in the positive direction in the Y-axis direction (in the rear direction), and then, the column 17 being integral with the nut 33 is moved in the rear direction. On the contrary, the screw shaft 32 is reversely rotated through the coupling 35 by the reverse rotation of the Y-axis servo-motor 36, and then, the nut 33 is moved in the negative direction of the Y-axis direction (on the front hand). Then, the column 17 being integral with the nut 33 is moved on the front hand. At this time, the column 17 is accurately moved in the Y-axis direction (in the front/rear direction) by guiding by the guide rails 20, 21 of the base 16.

The position of the column 17 in the Y-axis direction can be accurately controlled with a control of the rotational angle of the Y-axis servo-motor 36.

The head 18 is movable in the Z-axis direction along the guide rails 26, 27 of the column 17. Guide portions 38, 40 slidable along the guide rails 26, 27 are formed on a back face of the head 18, near left end portion (near the upper end portion of FIG. 2) and near the right end portion (near the lower end portion of FIG. 2) in the X-axis direction. And, a supporting portion 41 is formed on the back face of the head 18, on the upper side in the almost central portion in the X-axis direction. The supporting portion 41 is provided on the lower hand of the upper supporting portion 28 of the column 17. The supporting portion 41 is for supporting a nut 45 of the Z-axis ball screw 43. The supporting portion 41 immediately above the lower supporting portion 30 of the column 17 which is shown with a two-dot chain line shows the position thereof at the time when the head 18 is moved in the lower hand.

The Z-axis ball screw 43 is installed between the head 18 and the column 17. The Z-axis ball screw 43 has the screw shaft 44, the nut 45 and many balls installed therebetween (not shown). Of these elements, the screw shaft 44 is located for the Z-axis. More detailedly speaking, the screw shaft 44 is located on the Y-Z plane, being parallel to the Z-axis. The screw shaft 44 is rotatably supported by the supporting portion 28 which is on the upper side of the column 17 through a bearing in its upper end side, and is rotatably supported by the supporting portion 30 which is on the lower side of the column 17 through a bearing in its lower end side. An output shaft 50 of the Z-axis servo-motor 48 is connected with the upper end of the screw shaft 44, that is, the portion of the screw shaft 44 projecting from the supporting portion 28 on the upper hand through a coupling 47. The nut 45 is fixed by the supporting portion 41 of the head 18 with respect to the screw shaft 44, and is fitted on the screw shaft 44.

In such structured Z-axis ball screw 43, the screw shaft 44 is normally rotated by the normal rotation of the Z-axis servo-motor 48 through the coupling 47, and the nut 45 fitted thereon is moved in the positive direction in the Z-axis direction (on the upper hand). Then, the head 18 being integral with the nut 45 is moved in the upper direction. On the contrary, the screw shaft 44 is reversely rotated by the reverse rotation of the Z-axis servo-motor 48 through the coupling 47, and the nut 45 is moved in the negative direction of the Z-axis direction (in the lower direction). Then, the head 18 being integral with the nut 45 is moved in the lower direction. At this time, the head 18 can be accurately moved in the Z-axis direction (in the up/down direction) by guiding with the guide rails 26; 27 of the column 17. And, the position of the head 18 in the Z-axis direction can be accurately controlled with the control of the rotational angle of the Z-axis servo-motor 48.

The spindle 11 has a rotational center (vertical rotational center) facing the Z-axis direction, and is rotatably supported by the head 18. The spindle 11 has a tool mounting portion 51 at its top end portion, and is rotated and driven in both normal and reverse directions by a spindle motor (not shown).

As mentioned before, the main unit 10 has the base 16, the column 17, the head 18, the spindle 11 and so forth. The column 17 is moved in the Y-axis direction with respect to the base 16 by the rotation of the Y-axis servo-motor 36 through the Y-axis ball screw 31, and the head 18 is moved in the Z-axis direction with respect to the column 17 by the rotation of the Z-axis servo-motor 48 through the Z-axis ball screw 43. That is, the spindle 11 rotatably supported by the head 18 and the tool installed on the tool mounting portion 51 which is at the bottom of the spindle 11 can move in the Y-axis direction and Z-axis direction by the rotation of the Y-axis servo-motor 36 and the Z-axis servo-motor 48. In other words, the spindle 11 and the tool can be moved on the Y-Z plane by the rotation of the Y-axis and Z-axis servo-motors 36, 48.

The turn table 12 is located on the front side of the main unit 10, as shown in FIGS. 1, and 2. In this embodiment, the turn table 12 is formed in the square shape when seen from the top, and has the workpiece mounting face 52 on its upper face. The turn table 12 is rotated and driven around the rotational center O in a C-axis (rotational control axis the center of which is the Z-axis) direction by a motor (not shown). This rotational center O is an origin of the X-, Y-, and Z-axes. In this embodiment, the turn table 12 is not rotated in an A-axis (rotational control axis the center of which is the X-axis) direction nor in a B-axis (rotational control axis the center of which is the Y-axis) direction, and is not rotated in any direction of the X-, Y-, and Z-axes. But, the turn table 12 may be moved in the Y-axis direction and/or in the Z-axis direction if only the object of making the width of the machining center 1 in the X-axis direction (the right/left direction) shorter is taken into consideration. But, it is sufficient to rotate the turn table 12 only in the C-axis direction from the view of simplified structure.

The ATC (automatic tool changer) 13 is located in the space S of the base 16 at the back of the turn table 12. As shown in FIGS. 1 and 2, the ATC 13 has a tool magazine 53 in the shape of a horizontal disc, and a servo-motor 54 for rotating and driving it. The tool magazine 53 has many tool holding portions 55 each of which is at a position made by equally dividing the portion near its outer periphery in a circumferential direction, as shown in FIG. 2. The tool magazine 53 is formed so that its diameter has almost the same size as a width of the main unit 10 (or the base 16) in the X-axis direction. With such a structure, the ATC does not protrude from the main body 10 in the right/left direction, and besides, can secure the tool holding portions 55 as many as possible.

The servo-motor 54 is provided over a rotational center of the tool magazine 53, and directly rotates and drives the tool magazine 53 and controls its rotational angle. The rotational centers of both tool magazine 53 and the servo-motor 54 are vertical (parallel to the Z-axis) and both are positioned on the Y-Z plane. The whole ATC 13 is movable in the Y-axis direction by a moving mechanism (not shown). That is, the ATC 13 moves in a direction as shown by an arrow K (in the negative direction of the Y-axis direction) from a receding position of FIG. 1 so as to position the tool holding portion 55 which is scheduled for tool exchange at a tool exchange position (ATC point) P, and returns to the receding position from the ATC point P after tool exchange. Then, a tool can be exchanged in a rather short time due to the ATC 13 movable in the Y-axis direction in comparison with the structure having the spindle 11 movable in the Y-axis direction and the ATC 13 impossible to move in the Y-axis direction.

The separated control panel 14 is positioned at the back of the ATC 13, and individually formed, separated from the main unit 10. The separated control panel 14 stores a control panel for controlling operations of the Y-axis servo-motor 36, the Z-axis servo-motor 48, the spindle motor and the motor for driving the turn table 12, and can be moved from a predetermined position of FIG. 1 to a receding position (not shown) in the back direction (in the positive direction of the Y-axis direction).

The separated control panel 14 and the main unit 10 are connected with each other via an upper duct 56. And, cables and the like are provided at the upper duct 56 in order to electrically connect the separated control panel 14 and the main unit 10. A horizontal portion 57 of the upper duct 56 is formed above a position of a worker M so as not to interfere with operations by the worker M in a working space R, and the part thereof is expandable (not shown), making provision for the separated control panel 14 capable of receding in the rear direction. When the separated control panel 14 is located at the receding position, the working space R is formed between the separated control panel 14 and the main unit 10.

The console panel 15 is electrically connected with the separated control panel 14 through the cable in the upper duct 56. The console panel 15 is provided on a front face of a cover 58 covering a machining space N above the turn table 12 like a box. At a lower portion of the front face of the cover 58, a door (not shown) to be used for attaching a workpiece on the turn table 12 and detaching a machined workpiece is formed. The console panel 15 is movable in the Z-axis direction (in the up/down direction) between an operation position when the worker M operates (shown with a dotted line of FIG. 1) and a receding position which is a position upper than the operation position (shown with a full line of FIG. 1). The console panel 15 which is located at the receding position does not interfere with an attachment/detachment operation of a workpiece to/from the turn table 12 by the worker M.

The above-mentioned machining center 1 is provided with a chip carrying unit 60 for taking out chips made by a machining on a workpiece. The chip carrying unit 60 extends from a lower portion of the turn table 12 to a rear portion of the main unit 10 via a lower portion of the ATC 13, as shown in FIG. 1. The chip carrying unit 60 is a conveyer, for instance, and carries chips produced on the turn table 12 due to machining to a collecting point 61 which is set between the ATC 13 and the separated console panel 14 via the lower portion of the ATC 13. The carried chips are dropped in a bucket 62, which is provided under the collecting point 61, having an opening at its upper face, so as to be collected. The separated control panel 14 is moved to the receding position, so that the bucket 62 which collected chips can be taken out from the rear side of the machining center 1 (the back side: the right side of FIG. 1).

As shown in FIG. 2, the above-mentioned machining center 1 has such a structure that the main unit 10 having the spindle 11, and the other structural elements, such as the turn table 12, the ATC 13, the separated control panel 14, the console panel 15, the chip carrying unit 60 have the width the same as the main unit 10 in the X-axis direction (the right/left direction) or are positioned inside thereof in the X-axis direction, that is, these elements are stored in the X-axis direction of the main unit 10.

Operations of the machining center 1 having the above-mentioned structure are now explained.

The spindle 11 of the machining center 1 is movable at the time of machining on a workpiece in an area enclosed with points a, b, c and d of FIG. 1 on the Y-Z plane with the movement of the column 17 in the Y-axis direction relative to the base 16 and the movement of the head 18 in the Z-axis direction relative to the column 17. The movement of the spindle 11 in the Y-axis direction is from a front position (positions b, c) rather than the rotational center O (the origin of the X-, Y-, Z-axes) of the turn table 12 to the rear portion rather than the rear end of the turn table 12 (positions a, d). Therefore, the spindle can logically machine a workpiece having almost twice times distance from the rotational center O to position d along the Y-axis direction. The spindle 11 can be moved to position e, f or g of FIG. 1 at the time of tool exchange.

Figure 3:
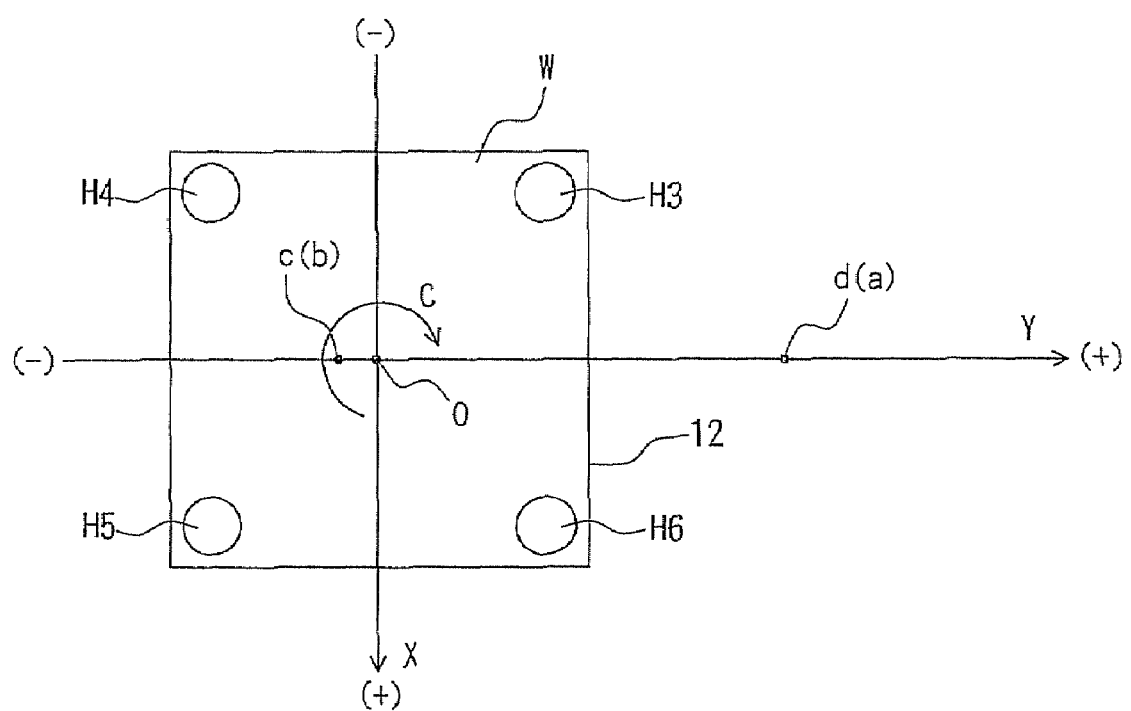
FIG. 3 is a view typically showing operations of the machining center.
Figure 4A:
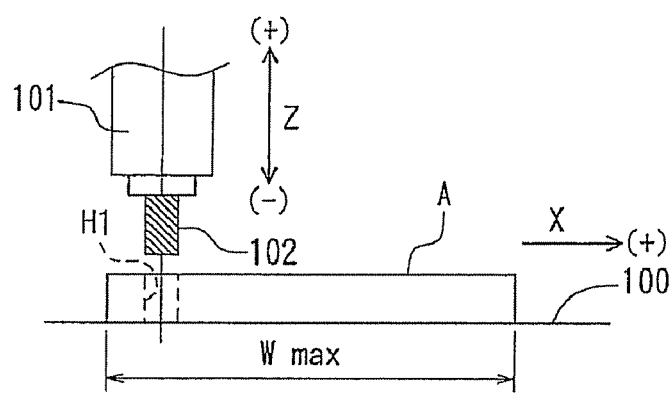
FIG. 4($a$), ($b$) are typical views for explaining operations of a conventional machining center.
Figure 4B:
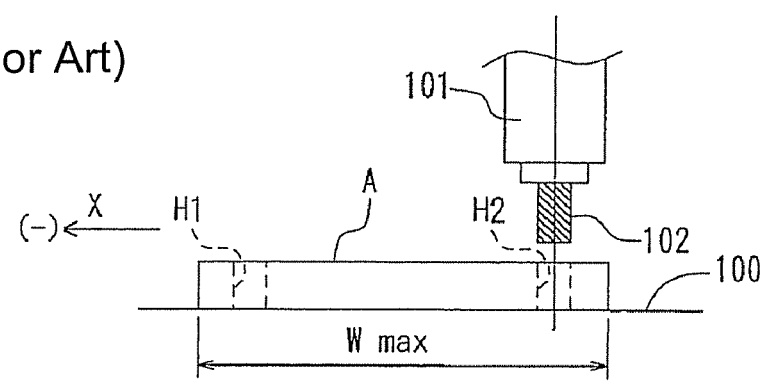

Further explanation is given, referring to FIG. 3 typically shown. FIG. 3 is an explanation view for forming holes H3, H4, H5 and H6 at four edges of a square (when seeing from the top) workpiece W which is the same size as the turn table 12. The turn table 12 is rotated in a C-axis direction, so that any of the holes H3 through H6 can be moved on the Y-axis of FIG. 3 within the bounds from c(b) to d(a) where the spindle 11 moves. That is, any of the holes H3 through H6 can be arranged inside the movement bounds c through d where machining can be executed with the spindle 11, by the rotation of the turn table 12 in the C-axis direction and the movement of the spindle 11 in the Y-axis direction. Furthermore, the holes H3 through H6 can be formed by the movement of the spindle 11 in the Z-axis direction.

An optional position of the workpiece W can be machined by the spindle 11 in a similar way. In FIG. 3, it is sufficient that the width of the machining center 1 in the X-axis direction (in the right/left direction) is the length of a diagonal of the square turn table 12 in principle. On the other hand, the machining center having a table movable in the X-axis direction necessarily has the width in the X-axis direction almost twice times of one side of the turn table 12, as already mentioned, referring to the prior art.

As mentioned above, the machining center 1 having the shorter width in the X-axis direction can be realized by moving the spindle 11 in the Y-axis direction and in the Z-axis direction and rotating the turn table 12 in the C-axis direction according to the machining center 1 of this embodiment.

With such a structure of the machining center 1, the whole width in the X-axis direction (the right/left direction) can be made shorter even if a plurality of machining centers 1 (three or more) are arranged in the right/left direction (in the X-axis direction) in a line.

When arranging three or more machining centers 1 in the right/left direction, maintenance of the main unit 10, manual tool exchange with respect to the tool magazine 53 of the ATC 13 and an operation of dealing with chips can not be executed from the sides of the main unit 10 (the left side and the right side) in the machining centers excluding ones arranged in both ends, which are arranged in an intermediate portion of the three or more machining centers.

Then, the separated control panel 14 which is independent from the main unit 10 is adopted as a control panel in this embodiment, and can recede in the rear direction, so that the working space R is formed between the main unit 10 and the separated control panel 14 when the control panel 14 recedes in the rear direction. With this structure, the maintenance of the main unit 10, the manual tool exchange in the ATC 13, the operation of dealing with chips can be executed through the working space R. Besides, chips are delivered to the collecting point 61 between the ATC 13 and the separated control panel 14, that is, to the collecting point 61 in the working space R with the chip carrying unit 60, so that the bucket 62 which collected the chips can be easily taken out to the rear side since the separated control panel 14 recedes.

Second Embodiment

Figure 5:
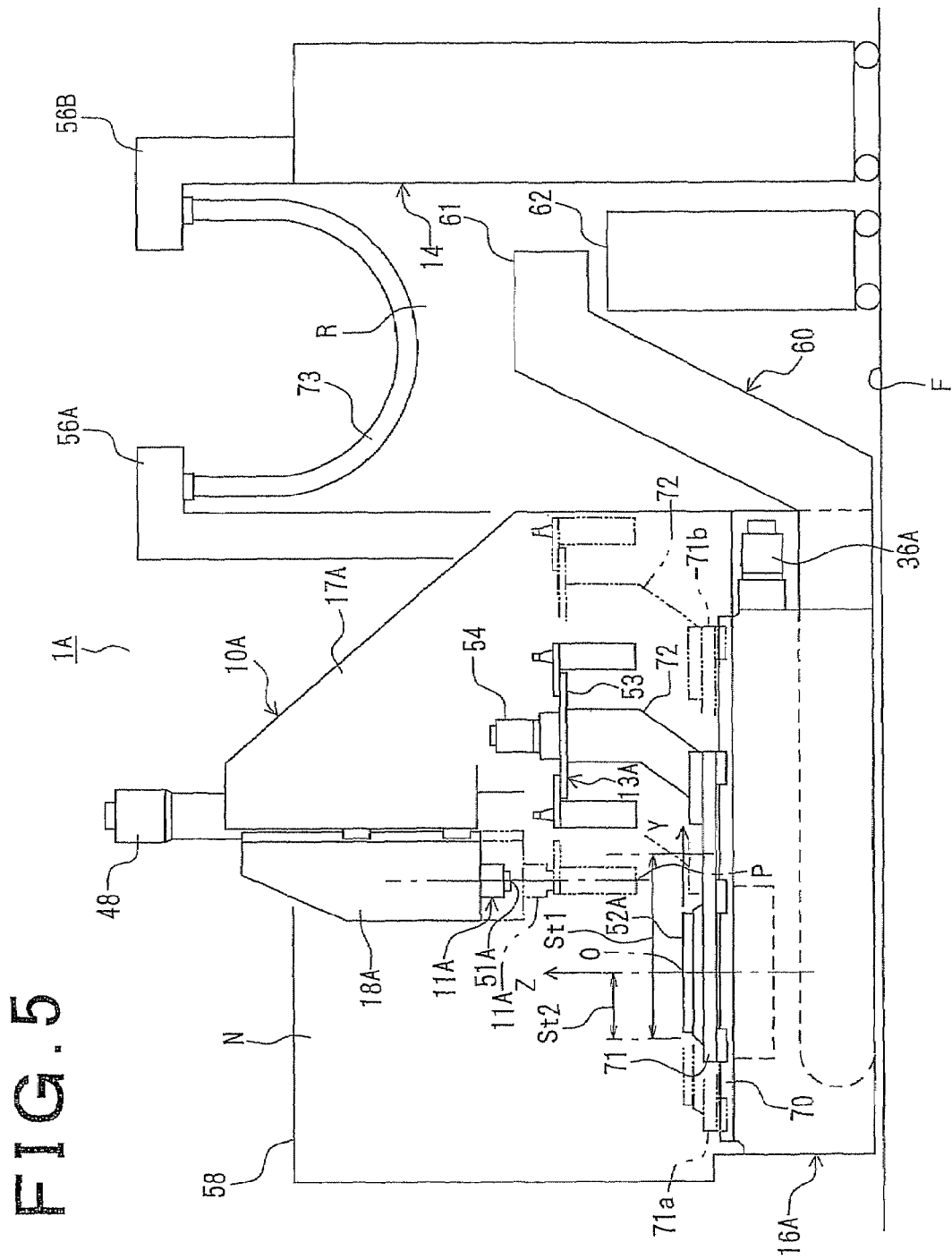
FIG. 5 is a view showing a machining center 1A according to a second embodiment, corresponding to FIG. 1.

FIG. 5 shows a machining center 1A according to a second embodiment, and corresponds to FIG. 1 according to the above-mentioned first embodiment. In FIG. 5, the structures and operations which are different from ones in FIG. 1 are mainly explained. Then, the same reference numeral is given to the element in FIG. 5, having the structure and the operation the same as ones in FIG. 1, thereby properly omitting explanation of the same element.

In the first embodiment, the turn table 12 is not movable in the Y-axis direction, but the column 17 is movable in the Y-axis direction. On the contrary, the second embodiment is widely different from the first one in such points that a column 17A is not movable in the Y-axis direction but a turn table 71 is movable in the Y-axis direction. Further explanation is given below.

The machining center 1A according to this embodiment has a spindle 11A which is a part of a main unit 10A, a turn table 12A which is located on the front side of the main unit 10A, an automatic tool changer (ATC) 13A which is located on the rear side of the turn table 12A, and the separated control panel 14 on the rear side of the ATC 13A, as shown in FIG. 5.

The main unit 10A has a base 16A, the column 17A fixed on the floor F, a head 18A supported by the column 17A, being free to move in the Z-axis direction, and the spindle 11A rotatably supported by the head 18A.

A Y-axis slidable face 70 is formed on the upper face of the base 16A in the Y-axis direction. A slide base 71 puts on the Y-axis slidable face 70, so that it can move in the Y-axis direction with the guide by the Y-axis slidable face 70. The turn table 12A which is rotatable in the C-axis direction (the rotational direction around the Z-axis) around the rotational center C is provided on the front edge side of the slide base 71.

A plane workpiece mounting face 52A for putting a workpiece (not shown) thereon is formed on the upper face of the turn table 12A. A stay 72 is fixed on the rear end side of the slide base 71 having the turn table 12A, and the automatic tool changer 13A is fixed on the stay 72. The automatic tool changer 13A has the tool magazine 53 and the servo-motor 54 for directly rotating and driving the tool magazine 53, similar to the automatic tool changer 13 of the first embodiment as shown in FIG. 1.

The slide base 71 is moved in the Y-axis direction by a servo-motor 36A which is provided at the rear end of the base 16A through a ball screw (not shown). For this ball screw, the Y-axis ball screw 31 as shown in FIG. 1 can be used. The slide base 71 moves in the bounds shown by the two-dot chain line of FIG. 5 (reference numerals 71a, 71b).

The reference numeral 71a shows a limit of moving the slide base 71 which is at a base position (shown with a full line) in the front direction, and the distance between the base position to the limit point is a stroke St2 (a stroke for the ATC) as shown in FIG. 5 which corresponds to a movement distance of the automatic tool changer 13A which is at a base position (shown with a full line) to a tool change position P. On the other hand, the reference numeral 71b shows a limit of moving the slide base 71 which is at the base position (shown with a full line) in the rear direction. Then, the movement area of the slide base 71 is from the reference numeral 71a to the reference numeral 71b, which corresponds to a stroke St1 (a Y-axis stroke).

Above the working space R of FIG. 5, a duct 56A on the main unit 10A side and a duct 56B on the separated control panel 14 side are provided, being separated from each other, and a wire harness for electrically connecting the main unit 10A side and the separated control panel 14 is hanged between the both so as to be loose so that the length thereof is sufficient when moving the separated control panel 14 in the rear direction.

In this embodiment, an upper half portion of the column 17A may be movable in the Y-axis direction, similar to the first embodiment so that the spindle 11A can move in the Y-axis direction. In this case, the spindle 11A may be moved in the Y-axis direction by the relative movement between the spindle 11A and the slide base 71 when machining a workpiece and exchanging a tool.

And, it is not always to provide the slide base 71 with the automatic tool changer 13A, but the both may be provided separated from each other as long as the automatic tool changer 13A is movable in the Y-axis direction. In this case, it is sufficient to move the automatic tool changer 13A only at the time of tool exchange, thereby avoiding unnecessary movement at the time of machining on a workpiece.

According to the machining center of the invention, such as the machining centers 1, 1A of the first and second embodiments, the width in the X-axis direction (the right/left direction) is short, and problems at the time when arranging a plurality of machining centers in the right/left direction, such as the maintenance of the main units 10, 10A, tool exchange in the ATC 13, 13A and dealing with chips can be effectively solved.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

What is claimed is:

1. A machining center for machining a workpiece on a table, comprising:
    a spindle being movable in a Z-axis direction with respect to a main unit, and being immovable in a Y-axis direction and in a X-axis direction, said spindle having a tool mounting portion on its end;
    a turn table located on a front side of said main unit, said turn table having a horizontal workpiece mounting face which rotates only in a C-axis direction;
    a slide base for moving with said turn table in said Y-axis direction; an automatic tool changer located on the slide base at the rear side of said turn table on said main unit side and in a position spaced from said turn table, having a tool change position on a Y-Z plane, said automatic tool changer being movable in said Y-axis direction; and
    a separated control panel independently formed from said main unit, said separated control panel located on a rear side of said automatic tool changer; characterized in that machining is executed on a workpiece on said workpiece mounting face by rotation of said turn table in said C-axis direction, movement of said slide base in said Y-axis direction and movement of said spindle in Z-axis direction, and a tool is exchanged between said spindle and said automatic tool changer by movement of said spindle in said Z-axis direction and movement of said automatic tool changer in said Y-axis direction.

2. The machining center according to claim 1, wherein said automatic tool changer is attached on said slide base, and is moved in said Y-axis direction together with said turn table with movement of said slide base in said Y-axis direction.

3. A machining center for machining a workpiece on a table, comprising:
    a spindle being movable in a Z-axis direction with respect to a main unit, and being immovable in a Y-axis direction and in a X-axis direction, said X-, Y-, and Z-axis directions being substantially perpendicular to one another, said Z-axis direction extending in the direction of a longitudinal axis of said spindle, and said spindle having a tool mounting portion on its end;
    a turn table located on a front side of said main unit, said turn table having a horizontal workpiece mounting face which rotates only in a C-axis direction, said turn table having a rotation axis that is immovable in the X-axis direction;
    a slide base for moving said turn table in said Y-axis direction; an automatic tool changer located on the rear side of said turn table on said main unit side, having a tool change position on a Y-Z plane, said automatic tool changer being movable in said Y-axis direction; and
    a separated control panel independently formed from said main unit, said separated control panel located on a rear side of said automatic tool changer; characterized in that machining is executed on a workpiece on said workpiece mounting face by rotation of said turn table in said C-axis direction, movement of said slide base in said Y-axis direction and movement of said spindle in Z-axis direction, and a tool is exchanged between said spindle and said automatic tool changer by movement of said spindle in said Z-axis direction and movement of said automatic tool changer in said Y-axis direction.

* * * * *